J. DAVIS.
Roller and Harrow.

No. 58,613.

Patented Oct. 9, 1866.

Witnesses:
F. A. Jackson
Wm. Trewin

Inventor:
James Davis
Per Munn & Co.
Attorneys

UNITED STATES PATENT OFFICE.

JAMES DAVIS, OF LOAMI, ILLINOIS.

IMPROVEMENT IN COMBINED ROLLER AND HARROW.

Specification forming part of Letters Patent No. 58,613, dated October 9, 1866.

*To all whom it may concern:*

Be it known that I, JAMES DAVIS, of Loami, Sangamon county, and State of Illinois, have invented a new and Improved Combined Roller and Harrow; and I do hereby declare that the following is a full, clear, and exact description thereof, which will enable others skilled in the art to make and use the same, reference being had to the accompanying drawings, forming part of this specification.

The nature of my invention relates to that class of agricultural implements which are indispensable, and which are usually cumbersome and imperfect in their operations.

By my invention I combine the harrow and roller into one machine, and mount both on wheels, and is so arranged that the driver may ride, so that the hardest work of the farm is made the easiest, both for the attendant and team.

My invention more particularly consists in gearing up the motion of the revolving harrow, and providing levers in such a manner that it may be elevated and lowered, as circumstances may require.

The advantages of this combined machine will be at once observed from the fact that as both machines are combined in one, one team and laborer are saved, and the work done equally well.

To enable others skilled in the art to make and use my invention, I will proceed to describe its construction and operation.

Figure 1:
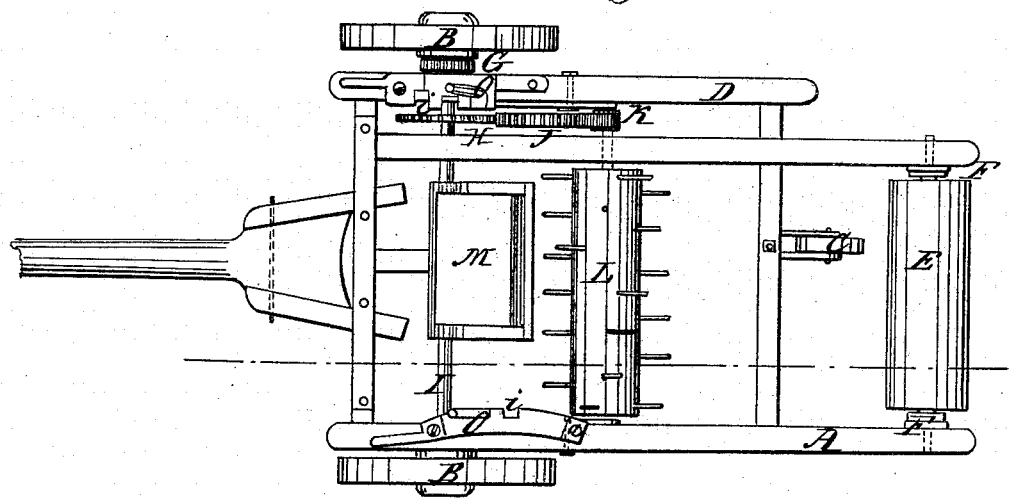
Figure 2:
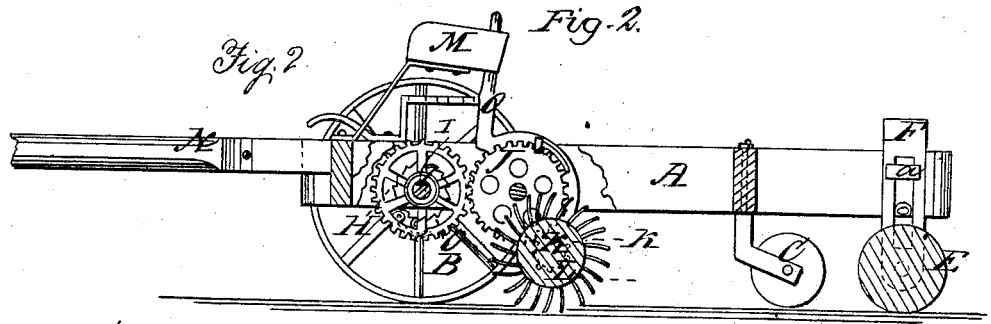

Figure 1 is a top-plan view of my combined harrow and roller. Fig. 2 is a side elevation of the same, with a portion of the frame removed.

Letters of like name and kind refer to like parts in each of the figures.

A is a rectangular frame, made of wood, and mounted on wheels B B and a caster-wheel, C.

At the outer side of the frame A is a timber, D, running longitudinally with and secured to the said frame A at a distance sufficient to admit the gear-wheels, which will be more fully described.

At the rear end of the said frame A is a roller, E, hung in slotted pendants F F, which are held in their place by screw-bolts $a\ a$, or other equivalents, passing through the slots into the frame, also pintles $c\ c$, for the purpose of keeping the said slotted pendants in an upright position. These slotted pendants or bars in which the roller is hung are allowed to work up and down together with the roller, so as to adjust and accommodate the roller to the unevenness of the ground.

When it is not designed to have the roller work, it may be raised and secured in an elevated position, which brings a portion of the weight of the frame upon the caster-wheel C, thus keeping the rear end of the frame from dragging on the ground.

G is a ratchet-wheel, secured upon the outside of the frame upon the axle of the wheels B B, in which works the pawl $o$ in the said ratchet-wheel G, so that when the machine is drawn forward the pawl engages the ratchet, and thus turns the shaft or axle I.

H is a gear-wheel, secured to the shaft or axle. J is also another gear-wheel, secured to a shaft that runs in bearings in the frame A and timber D.

K is a small pinion-wheel, secured to the end of the shaft of the harrow L. This harrow L is composed of a cylinder provided with curved teeth, set spirally around the said cylinder. These teeth are curved back, so that in their revolution they strike the ground with the points nearly horizontal, so that they have a tendency to crush or break the lumps of earth, so that they are pulverized.

M is the driver's seat, located nearly over the axle or shaft, and secured upon a spring or bar that inclines down and extends forward, and secured to the front part of the frame A. N is the tongue or pole, to which the team is attached and by which the combined machine is drawn.

The operation is in attaching the team to the pole, and, by moving forward, the pawl $o$ engages in the ratchet-wheel G, which causes the axle to turn, as also the gear-wheel H, which is engaged with the gear-wheel J, which receives motion from the gear-wheel H and imparts motion to the pinion K and harrow L.

It will here be understood that the harrow L may be set at any desired elevation, and adjusted to any position by means of the levers O O, which work in the notches $i\ i$ upon each side of the frame.

Having thus described my invention, what I claim as new, and desire to secure by Letters Patent, is—

1. The revolving harrow L, in combination with the pinion K, gear-wheels J and H, and traction-wheel B, for the purposes and substantially as described.

2. The levers O O, in combination with the harrow L, gear-wheels K, J, and H, substantially as set forth.

3. The roller E, in combination with the pendants F F, frame A and harrow L, all for the purposes and substantially as described.

JAMES DAVIS.

Witnesses:
R. R. ROBERTS,
JOHN H. LOWELL.